US012753285B2

(12) United States Patent
Maeda

(10) Patent No.: US 12,753,285 B2
(45) Date of Patent: Oct. 6, 2026

(54) GAS BARRIER LAMINATE, PACKAGING MATERIAL, PACKAGING BODY, AND PACKAGED ARTICLE

(71) Applicant: TOPPAN INC., Tokyo (JP)

(72) Inventor: Masaki Maeda, Tokyo (JP)

(73) Assignee: TOPPAN INC., Tokyo (JP)

( * ) Notice: Subject to any disclaimer, the term of this patent is extended or adjusted under 35 U.S.C. 154(b) by 622 days.

(21) Appl. No.: 18/199,343

(22) Filed: May 18, 2023

(65) Prior Publication Data

US 2023/0303788 A1 Sep. 28, 2023

Related U.S. Application Data

(63) Continuation of application No. PCT/JP2021/042484, filed on Nov. 18, 2021.

(30) Foreign Application Priority Data

Nov. 20, 2020 (JP) ................................ 2020-193219

(51) Int. Cl.

| | |
|---|---|
| ***C08J 7/04*** | (2020.01) |
| ***C08J 7/048*** | (2020.01) |
| ***C08K 3/34*** | (2006.01) |
| ***C08K 5/541*** | (2006.01) |

(52) U.S. Cl.

CPC ............ *C08J 7/0423* (2020.01); *C08J 7/048* (2020.01); *C08K 3/34* (2013.01); *C08K 5/541* (2013.01); *C08J 2323/12* (2013.01); *C08J 2333/08* (2013.01); *C08J 2433/02* (2013.01)

(58) Field of Classification Search

CPC ...... C08J 7/0423; C08J 7/048; C08J 2333/08; C08J 2323/12; C08J 2433/02; C08K 3/34; C08K 5/541

See application file for complete search history.

(56) References Cited

U.S. PATENT DOCUMENTS

| | | | |
|---|---|---|---|
| 2018/0230319 | A1 | 8/2018 | Matsui et al. |
| 2022/0177726 | A1 | 6/2022 | Okubo et al. |
| 2023/0365768 | A1 | 11/2023 | Takizawa et al. |

FOREIGN PATENT DOCUMENTS

| | | | |
|---|---|---|---|
| EP | 3 366 741 | A1 | 8/2018 |
| EP | 4 279 556 | A1 | 11/2023 |
| JP | H06-93133 | A | 4/1994 |
| JP | 2000-289154 | A | 10/2000 |
| JP | 2000-336195 | A | 12/2000 |
| JP | 2005-126528 | A | 5/2005 |
| JP | 2013-252618 | A | 12/2013 |
| JP | 2016-193509 | A | 11/2016 |
| JP | 2016-199722 | A | 12/2016 |
| JP | 2020-023130 | A | 2/2020 |
| JP | 2020-186774 | A | 11/2020 |
| WO | WO-03/091317 | A1 | 11/2003 |
| WO | WO-2005/053954 | A1 | 6/2005 |
| WO | WO-2020/203766 | A1 | 10/2020 |

OTHER PUBLICATIONS

Machine English translation of JP 2016-199722, Tokuda et al., Dec. 1, 2016.*

International Searching Authority, “International Search Report,” issued in connection with International Patent Application No. PCT/JP2021/042484, dated Feb. 1, 2022.

International Searching Authority, “Written Opinion,” issued in connection with International Patent Application No. PCT/JP2021/042484, dated Feb. 1, 2022.

European Extended Search Report issued in corresponding European Patent Application No. 21894730.7 dated Apr. 18, 2024 (7 pages).

* cited by examiner

*Primary Examiner* — Patrick D Niland

(74) *Attorney, Agent, or Firm* — Foley & Lardner LLP

(57) ABSTRACT

A gas barrier laminate including a substrate, an inorganic deposition layer containing an inorganic oxide, and a coating layer, arranged in this order, the coating layer contains a carboxy group-containing polymer (a), polyvalent metal-containing particles (b), a surfactant (c), and a silicon-containing compound (d), the silicon-containing compound (d) is at least one selected from the group consisting of a silane coupling agent having certain structures, hydrolysates thereof, and condensates thereof, a molar ratio $(d_t)/(a_t)$ represented by [the number of moles $(d_t)$ of the silicon-containing compound (d)/the number of moles $(a_t)$ of carboxy groups of the carboxy group-containing polymer (a)] is 0.15% or more and 6.10% or less, and the coating layer has a film thickness of 230 nm or more and 600 nm or less, with (d) in the molar ratio (d)/(a) is the mass of the silicon-containing compound (d) converted into an equivalent mass of the silane coupling agent.

12 Claims, 1 Drawing Sheet

GAS BARRIER LAMINATE, PACKAGING MATERIAL, PACKAGING BODY, AND PACKAGED ARTICLE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/042484, filed on Nov. 18, 2021, which in turn claims the benefit of JP 2020-193219, filed Nov. 20, 2020, the disclosures of all which are incorporated herein by reference in its entirety.

TECHNICAL FIELD

The present invention relates to gas barrier laminates, packaging materials, packaging bodies, and packaged articles.

BACKGROUND

When articles such as foods, drugs, cosmetics, agrichemicals, and industrial products are stored for a long period of time, their quality may deteriorate due to oxygen. To address this issue, films or sheets having oxygen gas barrier properties have been used as packaging materials for these articles.

Conventionally, materials including an aluminum foil as a gas barrier coating layer have often been used as such packaging materials. However, when a packaging material including an aluminum foil is used, the contents cannot be seen, and also metal detectors cannot be used. Accordingly, especially in the food and pharmaceutical fields, the development of transparent packaging materials having excellent gas barrier properties has been required.

Under such requirements, gas barrier laminates have been used in which a layer made of polyvinylidene chloride (PVDC) is provided on a substrate by applying a coating solution containing PVDC. The layer made of PVDC is transparent and has gas barrier properties.

However, there is concern that PVDC generates dioxins when incinerated. Therefore, a transition from PVDC to non-chlorinated materials has been required. Under such requirements, it has been proposed, for example, to use a polyvinyl alcohol (PVA) polymer instead of PVDC.

A layer made of a PVA-based polymer is dense because of hydrogen bonding of hydroxyl groups, and exhibits high gas barrier properties in a low humidity atmosphere. However, layers made of PVA-based polymers have a problem that, under a high humidity atmosphere, hydrogen bonding loosen because of moisture absorption, resulting in a significant decrease in gas barrier properties. Therefore, a gas barrier laminate including a PVA-based polymer layer as the gas barrier coating layer often cannot be used as a packaging material for items such as food that contain a lot of moisture, which limits its use to packaging materials for dry items and the like.

For the sake of further improving the gas barrier properties, adding an inorganic layered compound to the PVA-based polymer has been proposed (see PTL 1). However, even when an inorganic layered compound is added, since this does not make the PVA-based polymer itself more waterproof, the gas barrier properties still decrease in a high humidity atmosphere.

In order to improve the gas barrier properties in a high humidity atmosphere, it has been proposed to produce a gas barrier laminate by applying a coating solution containing a PVA-based polymer and a polymer capable of forming a crosslinked structure therewith onto a substrate, and then heat-treating them (for example, PTLs 2 and 3).

However, to obtain sufficient gas barrier properties using these techniques, the heat treatment after applying the coating solution needs to be performed at a high temperature, for example, above 150° C., to form the crosslinked structure. When, for example, the material of the substrate is made of a polyolefin such as polypropylene (OPP) or polyethylene (PE), such heat treatment degrades the substrate significantly. Accordingly, there is a need for a gas barrier laminate that can be produced under milder conditions, or where the material of the substrate is limited.

Another proposed method for forming a gas barrier coating layer includes forming a layer containing polycarboxylic acid-based polymer such as polyacrylic acid, and ionically crosslinking this polycarboxylic acid-based polymer using a polyvalent metal ion (see PTLs 4 to 6).

This method does not need the heat treatment at high temperature performed in the methods described in PTLs 2 and 3. This allows using polyolefin to be used for the substrate. In addition, the obtained gas barrier coating layer exhibits excellent gas barrier properties even in a high humidity atmosphere. Therefore, a gas barrier laminate including this gas barrier coating layer can also be applied to processes that involve heat sterilization, such as boiling and retort treatment.

However, when polycarboxylic acid-based polymers and polyvalent metal compounds coexist in the same coating solution, they tend to react with each other in the coating solution, which tends to cause precipitation. When there is precipitate in the solution, a uniform film cannot be formed. Accordingly, in this method, when the gas barrier coating layer is formed, a layer containing the polycarboxylic acid-based polymer and a layer containing the polyvalent metal compound are formed separately, or an aqueous solution of a polyvalent metal salt is brought into contact with the layer containing the polycarboxylic acid-based polymer. As a result, this method requires an increased number of steps in that the gas barrier coating layer 2 needs to have the two-layer structure.

A gas barrier film in which the polycarboxylic acid-based polymers and polyvalent metal compound particles are contained in the same gas barrier coating layer is disclosed in PTL 7. It is proposed that as the coating solution used to form the gas barrier coating layer, the water content of a coating solution containing a polycarboxylic acid-based polymer, polyvalent metal compound particles, a surfactant, and organic solvent should be 1000 ppm or less. Since this coating solution has a water content of 1000 ppm or less, the reaction between the polycarboxylic acid-based polymer and the polyvalent metal compound is suppressed.

CITATION LIST

Patent Literature

[PTL 1] JP H6-093133 A; [PTL 2] JP 2000-289154 A; [PTL 3] JP 2000-336195 A; [PTL 4] WO 2003/091317 A; [PTL 5] WO 2005/053954 A; [PTL 6] JP 2013-252618 A; [PTL 7] JP 2005-126528 A.

SUMMARY OF THE INVENTION

Technical Problem

PTL 7 describes that the coating solution disclosed therein can form a film that exhibits excellent gas barrier properties under high humidity conditions. However, a laminate formed by applying this coating solution undergo separation between the gas barrier coating layer and the adjacent layer, for example, the film substrate, under more severe high temperature and high humidity environments, and the gas barrier properties may deteriorate.

When a silane coupling agent is added to the gas barrier coating layer to increase the laminate strength between the film substrate and the gas barrier coating layer, the transparency is reduced. It is difficult to obtain a gas barrier laminate that is excellent in both transparency and gas barrier properties under a high temperature and high humidity environments.

An object of the present invention is to provide a gas barrier laminate that exhibits both high transparency and high gas barrier properties in a high temperature and high humidity environments, a packaging material, a packaging body, and a packaged article.

Solution to Problem

According to a first aspect of the present invention, there is provided a gas barrier laminate including a substrate, an inorganic deposition layer containing an inorganic oxide, and a coating layer, which are arranged in this order. The coating layer contains a carboxy group-containing polymer (a), polyvalent metal-containing particles (b), a surfactant (c), and a silicon-containing compound (d), the silicon-containing compound (d) is at least one selected from the group consisting of a silane coupling agent represented by a general formula (1), a silane coupling agent represented by a general formula (2), hydrolysates thereof, and condensates thereof, a molar ratio $(d_t)/(a_t)$ of a number of moles $(d_t)$ of the silicon-containing compound (d) to a number of moles $(a_t)$ of a carboxy group of the carboxy group-containing polymer (a) is 0.15% or more and 6.10% or less, and the coating layer has a film thickness of 230 nm or more and 600 nm or less. The symbol $(d_t)$ in the molar ratio $(d_t)/(a_t)$ is the mass of the silicon-containing compound (d) converted into an equivalent mass of the silane coupling agent.

$$Si(OR_1)_3Z_1 \quad (1)$$

$$Si(R_2)(OR_3)_2Z_2 \quad (2)$$

In the general formula (1), $R_1$ is an alkyl group having 1 to 6 carbon atoms which may be the same or different from each other, $Z_1$ is a group having an epoxy group, and in the general formula (2), $R_2$ is a methyl group. $R_3$ is an alkyl group having 1 to 6 carbon atoms and these may be the same or different from each other, and $Z_2$ is a group having an epoxy group.

In an embodiment of the present invention, the carboxy group-containing polymer (a) may contain at least a constituent unit originating from at least one α,β-mono ethylenically unsaturated carboxylic acid selected from the group consisting of acrylic acid, methacrylic acid, crotonic acid, itaconic acid, maleic acid, and fumaric acid.

In an embodiment of the present invention, a polyvalent metal forming the polyvalent metal-containing particles (b) may be a divalent metal.

In an embodiment of the present invention, the gas barrier laminate may further comprise an anchor coat layer between the substrate and the inorganic deposition layer.

According to a second aspect of the present invention, a packaging material including the gas barrier laminate is provided.

According to a third aspect of the present invention, a packaging body including the packaging material is provided.

According to a fourth aspect of the present invention, a packaged article including the packaging body and contents contained in the packaging body.

Advantageous Effects of the Invention

According to the present invention, it is possible to provide a gas barrier laminate that exhibits both high transparency and high gas barrier properties in a high temperature and high humidity environments, a packaging material, a packaging body, and a packaged article.

DETAILED DESCRIPTION

Figure 1:
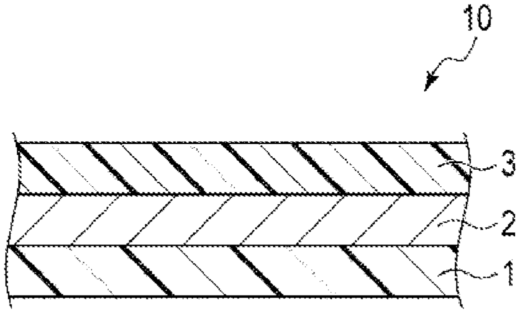
FIG. 1 is a schematic cross-sectional view of a gas laminate according to a first embodiment of the present invention.

With reference to the drawings, some embodiments of the present disclosure will be described in detail. It should be noted that, in the drawings, like or corresponding parts are designated with like reference signs to avoid duplicate description. The positional relationship between left, right, top and bottom is based on the positional relationship shown in the drawings unless otherwise specified. The dimensional ratios in the drawings are not limited to those shown therein.

FIG. 1 is a schematic cross-sectional view of a gas laminate according to a first embodiment of the present invention. The gas barrier laminate 10 shown in FIG. 1 includes a substrate 1, an inorganic deposition layer 2 containing an inorganic oxide, and a coating layer 3.

The coating layer 3 contains a carboxy group-containing polymer (a), polyvalent metal-containing particles (b), a surfactant (c), and a silicon-containing compound (d) described in detail below. Since the polyvalent metal ions originating from the polyvalent metal-containing particles (b) causes the carboxy group-containing polymer (a) to ionically crosslink, excellent gas barrier properties can be achieved even in a high humidity atmosphere. In addition, since the coating layer 3 contains the silicon-containing compound (d), the gas barrier properties can be further enhanced. On the other hand, to improve the transparency, the amount of the silicon-containing compound (d) is adjusted so that its molar ratio represented by [the number of moles $(d_t)$ of the silicon-containing compound (d)/the number of moles $(a_t)$ of the carboxy groups contained in the carboxy group-containing polymer (a)] is in the range of 0.15% or more and 6.10% or less, and the film thickness of the coating layer 3 is 230 nm or more and 600 nm or less. Since the gas barrier laminate 10 has the inorganic deposition layer 2 between the coating layer 3 and the substrate 1, the gas barrier properties are further improved, making it possible to achieve both transparency and high gas barrier properties.

<Coating Layer>

[Carboxy Group-Containing Polymer (a)]

The carboxy group-containing polymer (a) contained in the coating layer 3 is a polymer having two or more carboxy groups in a molecule, and may also be called a "polycarboxylic acid-based polymer" in the following. As described above, in the coating layer 3, the carboxy group-containing polymer (a) forms ionic crosslinks with metal ions originating from the polyvalent metal-containing particles (b) described later, and has excellent gas barrier properties. Typically, the carboxy group-containing polymer (a) may be a homopolymer of a carboxy group-containing unsaturated monomer, a copolymer of two or more carboxy group-containing unsaturated monomers, and a copolymer of a carboxy group-containing unsaturated monomer and other polymerizable monomers, or a polysaccharide containing a carboxy group in a molecule (also called "carboxy group-containing polysaccharide" or "acidic polysaccharide").

Carboxy groups include not only free carboxy groups but also acid anhydride groups (specifically, dicarboxylic anhydride groups). An acid anhydride group may be partially ring-opened to form a carboxy group. Part of the carboxy groups may be neutralized with alkali. In that case, the degree of neutralization is preferably 20% or less.

Here, the term "degree of neutralization" is the value obtained by performing the following method. That is, the carboxy groups can be partially neutralized by adding alkali ($f_r$) to the carboxy group-containing polymer (a). The ratio of the number of moles ($a_r$) of the carboxy groups in the carboxy group-containing polymer (a) to the number of moles ($f_r$) of the alkali (f) is the degree of neutralization.

In addition, a graft polymer obtained by graft polymerization between a polymer that does not contain carboxy groups, such as a polyolefin, and a carboxy group-containing unsaturated monomer can also be used as the carboxy group-containing polymer (a). It is also possible to use a polymer obtained by hydrolysis of a polymer having a hydrolyzable ester group, for example, an alkoxycarbonyl group (for example, a methoxycarbonyl group) to convert the group into a carboxy group.

A preferred example of the carboxy group-containing unsaturated monomer is an α,β-mono ethylenically unsaturated carboxylic acid. Therefore, the carboxy group-containing polymers (a) may include a homopolymer of an α,β-mono ethylenically unsaturated carboxylic acid, a copolymer of two or more kinds of α,β-mono ethylenically unsaturated carboxylic acid, and a copolymer of an α,β-mono ethylenically unsaturated carboxylic acid and other polymerizable monomers. The at least one other polymerizable monomer is typically an ethylenically unsaturated monomer.

Examples of the α,β-mono ethylenically unsaturated carboxylic acid include unsaturated monocarboxylic acids such as acrylic acid, methacrylic acid, and crotonic acid; unsaturated dicarboxylic acids such as maleic acid, fumaric acid, and itaconic acid; anhydrides of unsaturated dicarboxylic acids such as maleic acid and itaconic anhydride; and mixtures of two or more of these. Among these examples, at least one α,β-mono ethylenically unsaturated carboxylic acid selected from the group consisting of acrylic acid, methacrylic acid, crotonic acid, maleic acid, fumaric acid, and itaconic acid is preferable, and at least one α,β-mono ethylenically unsaturated carboxylic acid selected from the group consisting of acrylic acid, methacrylic acid, and maleic acid is more preferable.

Examples of other polymerizable monomers, particularly the other ethylenically unsaturated monomer, that can be co-polymerized with α,β-mono ethylenically unsaturated carboxylic acid include ethylene; α-olefins such as propylene, 1-butene, 1-pentene, 1-hexene, and 1-octene; saturated carboxylic vinyl esters such as vinyl acetate; acrylic alkyl esters such as methyl acrylate and ethyl acrylate; methacrylic alkyl esters such as methyl methacrylate and ethyl methacrylate; chlorine-containing vinyl monomers such as vinyl chloride and vinylidene chloride; fluorine-containing vinyl monomers such as vinyl fluoride and vinylidene fluoride; unsaturated nitriles such as acrylonitrile and methacrylonitrile; aromatic vinyl monomers such as styrene and α-methylstyrene; and itaconic alkyl esters. One or a combination of two or more of these ethylenically unsaturated monomers can be used. When the carboxyl group-containing polymer is a copolymer of an α,β-mono ethylenically unsaturated carboxylic acid and saturated carboxylic vinyl ester, such as vinyl acetate, the copolymer obtained by saponifying the former copolymer to convert the saturated carboxylic vinyl ester units to vinyl alcohol units can also be used.

Examples of the carboxy group-containing polysaccharide include acidic polysaccharides having a carboxy group in the molecule, such as alginic acid, carboxymethylcellulose, and pectin. One or a combination of two or more of these acidic polysaccharides can be used. It is also possible to combine an acidic polysaccharide with a (co)polymer of an α,β-mono ethylenically unsaturated carboxylic acid.

When the carboxy group-containing polymer is a copolymer of an α,β-mono ethylenically unsaturated carboxylic acid and another ethylenically unsaturated monomer, in order for the obtained film to have excellent gas barrier properties, hot water resistance, and water vapor resistance, the ratio of the number of moles of the α,β-mono ethylenically unsaturated carboxylic monomer to the total number of moles of these monomers in the copolymer is preferably 60 mol % or more, more preferably 80 mol % or more, and particularly preferably 90 mol % or more.

The carboxyl group-containing polymer (a) is preferably a homopolymer or a copolymer obtained by polymerization of an α,β-mono ethylenically unsaturated carboxylic acid alone, because it exhibits excellent gas barrier properties, moisture resistance, water resistance, hot water resistance, and water vapor resistance, and it is easy to obtain a film with excellent gas barrier properties under high humidity conditions. When the carboxy group-containing polymer (a) is a (co)polymer consisting only of α,β-mono ethylenically unsaturated carboxylic acid, preferred specific examples thereof include homopolymers and copolymers obtained by polymerization of at least one α,β-mono ethylenically unsaturated carboxylic acid selected from the group consisting of acrylic acid, methacrylic acid, crotonic acid, maleic acid, fumaric acid, and itaconic acid, and also mixtures of two or more of such homopolymers and copolymers. Among these, homopolymers and copolymers of at least one α,β-mono ethylenically unsaturated carboxylic acid selected from the group consisting of acrylic acid, methacrylic acid, and maleic acid are more preferable.

Particularly preferred examples of the carboxy group-containing polymer (a) are polyacrylic acid, polymethacrylic acid, polymaleic acid, and mixtures of two or more of these. The acidic polysaccharide is preferably alginic acid. Among these, polyacrylic acids are particularly preferable because they are relatively easy to obtain and it is easy to obtain a film having excellent physical properties.

The number average molecular weight of the carboxy group-containing polymer (a) is not particularly limited, but in terms of film formability and film properties, the number average molecular weight is preferably in the range of 2,000 to 10,000,000, more preferably in the range of 5,000 to 1,000,000, and further preferably in the range of 10,000 to 500,000.

Here, the term "number average molecular weight" is a value obtained from measurement using gel permeation chromatography (GPC). GPC measurement generally measures the number average molecular weight of a polymer as the equivalent number average molecular weight in terms of standard polystyrene.

[Polyvalent Metal-Containing Particles (b)]

The polyvalent metal-containing particles (b) contained in the coating layer 3 are preferably particles containing at least one polyvalent metal having a metal ion valence of 2 or more. The polyvalent metal-containing particles (b) may be particles of a polyvalent metal with a metal ion valence of 2 or more, or particles of a compound of a polyvalent metal with a metal ion valence of 2 or more or a mixture of these.

Specific examples of polyvalent metal include, but are not limited to, the metals of group 2A of the short period type periodic table such as beryllium, magnesium, and calcium; transition metals such as titanium, zirconium, chromium, manganese, iron, cobalt, nickel, copper, and zinc; and aluminum.

The polyvalent metal is preferably a divalent metal. In addition, it is preferable that the polyvalent metal forms compounds.

Specific examples of polyvalent metal compounds include, but are not limited to, polyvalent metal oxides, hydroxides, carbonates, and organic acid salts, and inorganic acid salts. Examples of the organic acid salt include, but are not limited to, acetates, oxalates, citrates, lactates, phosphates, phosphites, hypophosphites, stearates, and monoethylenically unsaturated carboxylates. Examples of the inorganic acid salt include, but are not limited to, chloride, sulfate, and nitrate. Alkylalkoxides of polyvalent metals can also be used as polyvalent metal compounds. One or a combination of two or more of these polyvalent metal compounds can be used.

Among the polyvalent metal compounds, in terms of the gas barrier properties of the gas barrier laminate 10, compounds of beryllium, magnesium, calcium, copper, cobalt, nickel, zinc, aluminum, and zirconium are preferable, and compounds of divalent metals such as beryllium, magnesium, calcium, copper, zinc, cobalt, and nickel are more preferable.

Examples of the preferred divalent metal compound include, but are not limited to, oxides such as zinc oxide, magnesium oxide, copper oxide, nickel oxide, and cobalt oxide; carbonates such as calcium carbonate; organic acid salts such as calcium lactate, zinc lactate, and calcium acrylate; and alkoxides such as magnesium methoxide.

The polyvalent metal or polyvalent metal compound is used as particles. The polyvalent metal particles (b) preferably have an average particle size in the range of 10 nm to 10 μm (or 10,000 nm) in the coating solution described later (hereinafter referred to as "coating solution for forming the coating layer" or simply "coating solution") used to form the coating layer 3 in view of the dispersion stability of the coating solution and the gas barrier properties of the gas barrier laminate 10. The average particle size of the polyvalent metal particles (b) in the coating solution may more preferably be in the range of 12 nm to 1 μm (or 1,000 nm), even more preferably be in the range of 15 nm to 500 nm, and particularly preferably be in the range of 15 nm to 50 nm.

When the average particle size of the polyvalent metal-containing particles (b) is too large, the uniformity of the film thickness of the coating layer 3, the flatness of the surface, the ionic crosslinking reactivity with the carboxy group-containing polymer (a), and the like tend to be insufficient. When the average particle size of the polyvalent metal-containing particles (b) is too small, the ionic crosslinking with the carboxy group-containing polymer (a) may proceed prematurely. In addition, when the average particle size of the polyvalent metal-containing particles (b) is too small, it may be difficult to uniformly disperse them in the coating solution.

When the sample is a dry solid, the average particle size of the polyvalent metal-containing particles (b) can be measured by measuring and counting with a scanning electron microscope or a transmission electron microscope. The average particle size of the polyvalent metal-containing particles (b) in the coating solution can be measured by a light scattering method [reference: "Microparticle Engineering System" Vol. I, pp. 362-365, Fuji Techno System (2001)].

The polyvalent metal-containing particles in the coating solution exist as primary particles, secondary particles, or a mixture of these, but in many cases, they are presumed to exist as secondary particles considering the average particle size.

[Surfactant (c)]

The coating layer 3 contains a surfactant (c) in order to facilitate dispersion of the polyvalent metal-containing particles (b). A surfactant is a compound having both a hydrophilic group and a lipophilic group in its molecule. Surfactants include anionic, cationic, and amphoteric ionic surfactants, as well as nonionic surfactants. Any surfactant can be used for the coating layer 3.

Examples of the anionic surfactant include carboxylic acid, sulfonic acid, sulfate, and phosphate ester types. Examples of the anionic surfactant of the carboxylic acid type include aliphatic monocarboxylates, polyoxyethylene alkyl ether carboxylates, N-acylsarcosinates, and N-acylglutamates. Examples of the anionic surfactant of the sulfonic acid type include dialkylsulfosuccinates, alkanesulfonates, alpha-olefinsulfonates, linear alkylbenzenesulfonates, alkyl (branched) benzenesulfonates, and naphthalenesulfonate-formaldehyde condensates, alkyl naphthalene sulfonates, and N-methyl-N-acyl taurates. Examples of the anionic surfactant of the sulfate type include alkyl sulfates, polyoxyethylene alkyl ether sulfates, and oil-and-fat sulfuric acid ester salt. Examples of the anionic surfactant of the phosphate ester type include the alkyl phosphate type, polyoxyethylene alkyl ether phosphates, and polyoxyethylene alkylphenyl ether phosphates.

Examples of the cationic surfactant (c) include alkylamine salt type and quaternary ammonium salt type surfactants. Examples of the cationic surfactant of the alkylamine salt type include monoalkylamine salts, dialkylamine salts, and trialkylamine salts. Examples of the cationic surfactant of the quaternary ammonium salt type include halogenated (chlorinated, brominated or iodinated) alkyltrimethylammonium salts and alkylbenzalkonium chlorides.

Examples of the amphoteric surfactant include the carboxybetaine type, 2-alkylimidazoline derivative type, glycine type, and amine oxide type. Examples of the amphoteric surfactant of the carboxybetaine type include alkylbetaines and fatty acid amidopropylbetaines. Examples of the amphoteric surfactant of the 2-alkylimidazoline derivative type include 2-alkyl-N-carboxymethyl-N-hydroxyethylimidazolinium betaines. Examples of the amphoteric surfactant of the glycine type include alkyl or dialkyldiethylenetriaminoacetic acids. Examples of the amphoteric surfactant of the amino oxide type include alkylamine oxides.

Examples of the nonionic surfactant include the ester type, ether type, ester ether type, and alkanolamide type. Examples of the nonionic surfactant of the ester type include glycerin fatty acid esters, sorbitan fatty acid esters, and sucrose fatty acid esters. Examples of the nonionic surfactant of the ether type include polyoxyethylene alkyl ethers, polyoxyethylene alkylphenyl ethers, and polyoxyethylene polyoxypropylene glycols. Examples of the nonionic surfactant of the ester ether type include fatty acid polyethylene glycol and fatty acid polyoxyethylene sorbitans. Examples of the nonionic surfactant of the alkanolamide type include fatty acid alkanolamides.

Surfactants with a polymer backbone such as styrene-acrylic acid copolymers may also be used.

Among these surfactants, anionic surfactants such as phosphate esters, and surfactants having a polymer backbone such as styrene-acrylic acid copolymers are preferable.

[Silicon-Containing Compound (d)]

The coating layer 3 contains a silicon-containing compound (d) in order to increase the separation strength. The silicon-containing compound (d) is at least one selected from the group consisting of a silane coupling agent represented by the following general formula (1), a silane coupling agent represented by the following general formula (2), hydrolysates thereof, and condensates thereof.

$$Si(OR_1)_3Z_1 \quad (1)$$

$$Si(R_2)(OR_3)_2Z_2 \quad (2)$$

In the general formula (1), $R_1$ is an alkyl group having 1 to 6 carbon atoms which may be the same or different from each other. $Z_1$ is a group having an epoxy group. In the general formula (2), $R_2$ is a methyl group, $R_3$ is an alkyl group having 1 to 6 carbon atoms which may be the same or different from each other, and $Z_2$ is a group having an epoxy group.

A silane coupling agent readily undergoes hydrolysis, and readily undergoes a condensation reaction in the presence of acid or alkali. Therefore, in the coating layer 3, it is rare for the silicon-containing compound (d) to exist only in the form of the silane coupling agent represented by the general formula (1) or (2), only in the form of a hydrolysate thereof, or only in the form a condensate thereof. In other words, in the coating layer 3, the silicon-containing compound (d) is normally a mixture of at least one of the silane coupling agents represented by the general formulas (1) and (2), hydrolysates thereof, and condensates thereof.

Each of $R_1$ and $R_3$ in the general formulas (1) and (2) may be an alkyl group having 1 to 6 carbon atoms, and is preferably a methyl group or an ethyl group. Each of $Z_1$ and $Z_2$ may be a group containing an epoxy group, for example, an organic group having a glycidyloxy group.

Specific examples of the silane coupling agent represented by the general formula (1) or (2) include 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane. Of these, preferred examples are 3-glycidoxypropylmethyldimethoxysilane and 3-glycidoxypropyltrimethoxysilane. One or a combination of two or more of these silane coupling agents may be used.

A hydrolysate of the silane coupling agent represented by the general formula (1) or (2) may be partially hydrolyzed, completely hydrolyzed, or a mixture thereof.

The condensates the coating layer 3 may contain as at least part of the silicon-containing compound (d) are two or more of: hydrolytic condensates of a silane coupling agent represented by the general formula (1), hydrolytic condensates of a silane coupling agent represented by the general formula (2), a hydrolysate of the silane coupling agent represented by the general formula (1) and a hydrolysate of the silane coupling agent represented by the general formula (2). These hydrolytic condensates are produced by the following reaction. First, the silane coupling agent is hydrolyzed. A hydrolysate is obtained as a result of one or more of the alkoxy groups of the silane coupling agent molecule being substituted with hydroxyl groups. After that, condensation of these hydrolysates is performed to form a compound in which silicon atoms (Si) are bonded via oxygen. Such condensation is repeated to obtain a hydrolytic condensate.

[Composition]

The coating layer 3 preferably contains the carboxy group-containing polymer (a) and the polyvalent metal-containing particles (b) in the following formulation ratio. That is, the ratio $((b_t)/(a_t))$ (hereinafter also referred to as an equivalent ratio) of the product $(b_t)$ of the number of moles of the polyvalent metal contained in the polyvalent metal-containing particles (b) and its valence to the number of moles $(a_t)$ of the carboxy groups of the carboxy group-containing polymer (a) is preferably 0.6 or more. This ratio is more preferably 0.8 or more, particularly preferably 1.0 or more. The upper limit for this ratio is usually 10.0, preferably 2.0. When the ratio is too small, various properties of the gas barrier laminate 10 such as the gas barrier properties, hot water resistance, and water vapor resistance tend to deteriorate.

The above-described equivalent ratio can be calculated, for example, as follows. By way of example, here, it is assumed that the carboxy group-containing polymer (a) is polyacrylic acid and the polyvalent metal compound particles (b) are magnesium oxide.

Polyacrylic acid has a molecular weight of 72 per monomer unit and one carboxy group per monomer molecule. Therefore, the amount of carboxy groups in 100 g of polyacrylic acid is 1.39 mol. When the equivalent ratio of a coating solution containing 100 g of polyacrylic acid is 1.0, the coating layer 3 contains an amount of magnesium oxide that neutralizes 1.39 mol of carboxy groups. Accordingly, in order to achieve the equivalent ratio of 0.6 in the coating layer 3 containing 100 g of polyacrylic acid, the coating layer 3 should contain an amount of magnesium oxide that neutralizes 0.834 mol of carboxy groups. Here, magnesium is divalent, and the molecular weight of magnesium oxide is 40. Accordingly, in order to achieve the equivalent ratio of 0.6 in the coating layer 3 containing 100 g of polyacrylic acid, the coating layer 3 should contain 16.68 g (0.417 mol) of magnesium oxide.

The surfactant (c) is used in an amount sufficient to stably disperse the polyvalent metal-containing particles in the coating solution. Therefore, when the amount of the surfactant is described as the concentration in the coating solution for forming the coating layer, it is usually in the range of 0.0001 to 70% by mass, preferably 0.001 to 60% by mass, and even more preferably 0.1% to 50% by mass in the coating solution.

When the surfactant (c) is not added, it becomes difficult to disperse the polyvalent metal-containing particles (b) in the coating solution so that their average particle size is sufficiently small. This makes it difficult to obtain a coating solution in which the polyvalent metal-containing particles (b) are uniformly dispersed. This in turn makes it difficult to obtain a coating layer 3 having a uniform film thickness obtained by applying the coating solution on the inorganic deposition layer 2 and drying it.

In order for the gas barrier laminate 10 to have both high gas barrier properties and transparency, the coating layer 3 contains the silicon-containing compound (d) in an amount that allows the molar ratio $(d_t)/(a_t)$ of the number of moles $(d_t)$ of the silicon-containing compound (d) to the number of moles $(a_t)$ of the carboxy groups of the carboxy group-containing polymer (a) to be 0.15% or more and 6.10% or less. Here, $(d_t)$ in the molar ratio $(d_t)/(a_t)$ is the number of moles of the silicon-containing compound (d) converted into the equivalent number of moles of the silane coupling agent.

When the amount of the silicon-containing compound (d) added is too small, and the molar ratio $(d_t)/(a_t)$ is less than 0.15%, the separation strength of the gas barrier laminate 10 becomes low. Therefore, careful handling is required to prevent delamination, leading to a decrease in productivity.

Considering this, the molar ratio $(d_t)/(a_t)$ of the number of moles $(d_t)$ of the silicon-containing compound (d) to the number of moles $(a_t)$ of the carboxy groups contained in the carboxyl group-containing polymer (a) is preferably 0.3% or more, more preferably 0.46% or more, and particularly preferably 0.61% or more.

On the other hand, when the amount of the silicon-containing compound (d) added is too large, and the molar ratio $(d_t)/(a_t)$ becomes larger than 6.10%, the gas barrier laminate 10 will have reduced transparency. In addition, the silicon-containing compound (d) does not have gas barrier properties. Therefore, when the molar ratio $(d_t)/(a_t)$ is higher than 6.10%, not only the transparency of the laminate decreases, but also the gas barrier properties decrease.

Considering this, the molar ratio $(d_t)/(a_t)$ of the number of moles $(d_t)$ of the silicon-containing compound (d) to the number of moles $(a_t)$ of the carboxy groups contained in the carboxyl group-containing polymer (a) is preferably 4.57% or less, more preferably 3.66% or less, and particularly preferably 2.13% or less.

The film thickness of the coating layer 3 is 230 nm or more and 600 nm or less from the viewpoint of achieving both transparency and gas barrier properties. The film thickness of the coating layer 3 is specifically the film thickness measured by a method for measuring the film thickness of the coating layer described later. The coating layer 3 preferably has a film thickness of 250 nm or more and 500 nm or less, more preferably 300 nm or more and 450 nm or less.

<Inorganic Deposition Layer>

The gas barrier laminate 10 according to the present embodiment includes an inorganic deposition layer 2 disposed between the substrate 1 and the coating layer 3. This allows the gas barrier laminate 10 having the coating layer 3 to have improved gas barrier properties, and both transparency and high gas barrier properties can be achieved.

The inorganic deposition layer 2 contains an inorganic oxide. Examples of the inorganic oxide include aluminum oxide, silicon oxide, magnesium oxide, and tin oxide. Among these, aluminum oxide, silicon oxide, magnesium oxide, or a mixture of two or more of these is preferable to achieve both transparency and gas barrier properties.

The inorganic deposition layer 2 may have a thickness in the range of, for example, 5 to 100 nm or in the range of 10 to 50 nm. To form a uniform thin film, the inorganic deposition layer 2 preferably has a thickness of 5 nm or more. When the thin film as a gas barrier material is uniform, the function required for the gas barrier material can be sufficiently fulfilled. To have a flexible thin film, the inorganic deposition layer 2 preferably has a thickness of 100 nm or less. When the gas barrier material has poor flexibility, it may crack due to external factors such as bending and stretching.

<Substrate>

The substrate 1 of the gas barrier laminate 10 according to the present embodiment is not particularly limited, and various types can be used. The material of the substrate 1 is not particularly limited, but various types can be used, such as plastic or paper.

The substrate 1 may be a single layer made of a single material, or may be a multilayer made of a plurality of materials. An example of a multilayer substrate is a film made of plastic laminated to paper.

Among these, the material forming the substrate 1 is preferably plastic, because it can be formed into various shapes and its application is further expanded by adding gas barrier properties.

Examples of the plastic include, but are not limited to, polyolefin resins such as polyethylene and polypropylene; polyester-based resins such as polyethylene terephthalate, polyethylene-2,6-naphthalate, polybutylene terephthalate, and copolymers thereof, polyamide-based resins such as nylon-6, nylon-66, nylon-12, meta-xylylene adipamide, and copolymers thereof; styrene-based resins such as polystyrene, styrene-butadiene copolymer, and styrene-butadiene-acrylonitrile copolymer; poly(meth)acrylate ester; polyacrylonitrile; polyvinyl acetate; ethylene-vinyl acetate copolymer; ethylene-vinyl alcohol copolymer; polycarbonate; polyarylate; regenerated cellulose; polyimide; polyether imide; polysulfone; polyether sulfone; polyether ketone; and ionomer resin.

When the gas barrier laminate is used as a food packaging material, the substrate 1 is preferably made of polyethylene, polypropylene, polyethylene terephthalate, nylon-6, or nylon-66.

One or a mixture of two or more kinds of plastics can be used as the material(s) of the substrate 1.

Additives may be added to the plastic. One or more known additives can be used as appropriate such as a pigment, an oxidation inhibitor, an antistatic agent, an ultraviolet absorbing agent and a lubricant, depending on the application. These additives may be used singly or in combination of two or more.

The form of the substrate 1 is not particularly limited, and, for example, it may be in the form of a film, a sheet, a cup, a tray, a tube, or a bottle. Among these, a film is preferred.

When the substrate 1 is a film, the film may be a stretched film, or may be an unstretched film.

Although the thickness of the film is not particularly limited, in order for the obtained gas barrier laminate to have excellent mechanical strength and processability, the thickness may preferably be 1 to 200 μm, more preferably 5 to 100 μm.

The surface of the substrate 1 may be subjected to plasma treatment, corona treatment, ozone treatment, flame treatment, radical activation treatment with ultraviolet radiation (UV) or electron beams, and the like such that the coating solution can be applied without being repelled by the substrate. The treatment method is appropriately selected according to the type of substrate.

[Other Layers]

The gas barrier laminate according to the present embodiment may further include one or more layers in addition to the substrate 1, the inorganic deposition layer 2, and the coating layer 3, as necessary.

For example, a gas barrier laminate according to the present embodiment may include only the coating layer 3 described above as a gas barrier coating layer. Alternatively, in addition to the coating layer 3, it may further include one or more other layers. For example, a layer of an inorganic compound such as aluminum oxide, silicon oxide, or aluminum may be formed on the surface of the substrate using sputtering, ion plating, or the like.

To enhance the adhesion between layers, or to allow the coating solution for coating layer formation to be without being repelled by the inorganic deposition layer, the gas barrier laminate according to the present embodiment may further have an anchor coat layer between the substrate 1 and the inorganic deposition layer 2 or between the inorganic deposition layer 2 and the coating layer 3.

Figure 2:
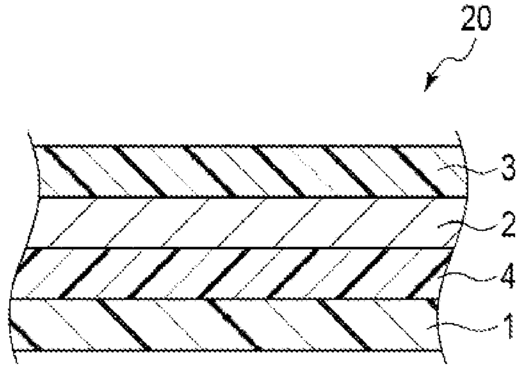
FIG. 2 is a schematic cross-sectional view of a gas laminate according to a second embodiment of the present invention.

FIG. 2 is a schematic cross-sectional view of a gas laminate according to a second embodiment of the present invention. In contrast to the gas barrier laminate 10 according to the first embodiment described above, a gas barrier laminate 20 shown in FIG. 2 further includes an anchor coat layer 4 between the substrate 1 and the inorganic deposition layer 2.

The anchor coat layer 4 can be formed by a conventional method using a known anchor coat solution. Examples of the anchor coat solution include those containing resins such as polyurethane resin, acrylic resin, melamine resin, polyester resin, phenol resin, amino resin, and fluorine resin.

In addition to the resin, the anchor coat solution can further contain an isocyanate compound for the sake of improving adhesion and hot water resistance. Isocyanate compounds may have one or more isocyanate groups in the molecule, and examples thereof include hexamethylene diisocyanate, xylylene diisocyanate, isophorone diisocyanate, and tolylene diisocyanate.

The anchor coat solution may further contain a liquid medium for dissolving and dispersing resins or isocyanate compounds.

The thickness of the anchor coat layer 4 is not particularly limited. The anchor coat layer 4 may have a thickness of, for example, in the range of 0.01 to 2 μm, or in the range of 0.05 to 1 μm. When the film thickness is less than 0.01 μm, it may be too thin for the layer to exhibit sufficient performance as an anchor coat layer. On the other hand, it is preferable from the viewpoint of flexibility that the film thickness is 2 μm or less. An anchor coat layer with reduced flexibility may crack due to external factors.

The gas barrier laminate according to the present embodiment may further include, as necessary, another layer laminated via an adhesive onto the coating layer 3, or the surface of the substrate 1 or inorganic deposition layer 2. The further layer may be formed by extrusion-lamination using an adhesive resin.

The further layer in the laminate can be appropriately selected depending on the desired effect such as imparting strength, imparting sealing properties, easiness to open when sealed, improving design, imparting light blocking properties, or imparting moisture resistance. Although the material is not particularly limited, for example, it may have properties similar to those of the plastics described above with respect to the substrate. In addition, paper and aluminum foil can also be used.

The further layer in the laminate preferably has a thickness in the range of 1 to 1000 μm, more preferably 5 to 500 μm, even more preferably 5 to 200 μm, and particularly preferably 5 to 150 μm.

Other layers to be laminated may be of one or more types.

The gas barrier laminate according to the present embodiment may further include a print layer, as needed. The print layer may be formed on the coat layer provided on the substrate, or may be formed on the surface of the substrate where the coat layer is not provided. In addition, when another layer is laminated, it may be formed on top of other layers to be laminated.

[Method of Producing Gas Barrier Laminate]

The gas barrier laminate according to the present embodiment can be produced using a production method including a step of forming an inorganic deposition layer and a step of forming a coating layer using the coating solution for coating layer formation described below. This production method can further include a step of forming other layers such as an anchor coat layer, and/or a step of forming a print layer, as necessary.

A method of producing the gas barrier laminate 20 shown in FIG. 2 will be described below as an example of the method of producing a gas barrier laminate according to the present embodiment.

In the method of manufacturing the gas barrier laminate 20, the anchor coat layer 4 is formed on the substrate 1. The anchor coat layer 4 can be formed by applying the above-described anchor coat solution onto the substrate 1 and drying the formed coating film. The method of applying the anchor coat solution is not particularly limited, and it may be carried out using a well-known printing method such as offset printing, gravure printing, or silk screen printing, or a well-known coating method such as roll coating, knife edge coating, or gravure coating. By drying the formed coating film, removal of the solvent and curing proceed, and the anchor coat layer 4 is formed.

In the method of producing the gas barrier laminate 20, the inorganic deposition layer 2 is formed on the anchor coat layer 4. Various methods such as vacuum deposition, sputtering, ion plating, and chemical vapor deposition (CVD) are known as methods that can be used to form the inorganic deposition layer 2, and either method can be used, but it is generally formed by vacuum deposition.

Examples of the heating means for a vacuum deposition device using a vacuum deposition method include electron beam heating, resistance heating, and induction heating, and any of them can be used.

In order to enhance the adhesion between the inorganic deposition layer 2 and the anchor coat layer 4 and to improve the density of the inorganic deposition layer 2, a plasma assisted method or ion beam assisted method can be used.

To increase the transparency of the inorganic deposition layer 2, reactive vapor deposition, in which oxygen gas or the like is blown into the inorganic deposition layer 2, may also be used.

In the method of producing the gas barrier laminate 20, the coating layer 3 is formed on the inorganic deposition layer 2. The coating layer 3 can be formed by applying a coating solution for coating layer formation prepared as described below onto the inorganic deposition layer 2 and drying the formed coating film.

Preparation of Coating Solution for Coating Layer Formation

An organic solvent (e) is used as a solvent or dispersion medium in the coating solution for coating layer formation. That is, the coating solution is a dispersion liquid containing the carboxy group-containing polymer (a), polyvalent metal-containing particles (b), surfactant (c), silicon-containing compound (d) and an organic solvent in which the polyvalent metal-containing particles (b) are dispersed.

The organic solvent (e) is used in an amount sufficient for the carboxy group-containing polymer (a) to be uniformly dissolved and the polyvalent metal-containing particles to be uniformly dispersed. Therefore, the organic solvent used is one that dissolves the carboxyl group-containing polymer but does not substantially dissolve the polyvalent metal compound and can disperse it in the form of particles.

As the organic solvent (e), a polar organic solvent that dissolves the carboxy group-containing polymer (a) is generally used. It is also possible to use an organic solvent that does not have a polar group (a heteroatom or an atomic group including a heteroatom) together with a polar organic solvent.

Examples of the preferred organic solvent (e) include alcohols such as methanol, ethanol, isopropanol, n-propanol, and n-butanol; and polar organic solvents such as dimethyl sulfoxide, N,N-dimethylacetamide, N,N-dimethylformamide, N-methyl-2-pyrrolidone, tetramethylurea, hexamethylphosphoric triamide, and γ-butyrolactone.

In addition to the above polar organic solvents, hydrocarbons such as benzene, toluene, xylene, hexane, heptane, and octane; ketones such as acetone and methyl ethyl ketone; halogenated hydrocarbons such as dichloromethane; esters such as methyl acetate; and ethers such as diethyl ether can be used as the organic solvent (e) as appropriate. A hydrocarbon that has no polar group, such as benzene, is generally used together with a polar organic solvent.

The coating solution may include only the organic solvent (e) as a solvent or dispersion medium, but may further include water. When water is included, the solubility of the carboxy group-containing polymer (a) can be improved, which improves the applicability and workability of the coating solution. The water content of the coating solution may be 100 ppm or more, 1,000 ppm or more, 1,500 ppm or more, or 2,000 ppm or more, in terms of mass fraction.

The water content of this coating solution may preferably be 50,000 ppm or less, more preferably 10,000 ppm or less, and even more preferably 5,000 ppm or less, in terms of mass fraction.

In the preparation of the coating solution for coating layer formation, after uniformly dissolving the carboxy group-containing polymer (a) in the organic solvent (e), the silicon-containing compound (d) is added thereto to obtain a carboxyl group-containing polymer solution.

In addition, the polyvalent metal-containing particles (b), the surfactant (c), and the organic solvent (e) are mixed together, and, if necessary, subjected to dispersion treatment to prepare a dispersion liquid. The dispersion treatment is carried out so that the average particle size of the polyvalent metal-containing particles (b) has a predetermined value. When the average particle size of the polyvalent metal-containing particles (b) in the mixed solution before the dispersion treatment is 10 μm or less, the dispersion treatment may be omitted, but is preferred to be carried out in this case as well. The dispersion treatment dissolves the aggregation of the polyvalent metal-containing particles (b), which stabilizes the coating solution and increases transparency of the gas barrier laminate obtained by applying the coating solution. Further, when the coating solution is applied and dried, this facilitates the crosslink formation between the carboxy group-containing polymer (a) and the polyvalent metal ions originating from the polyvalent metal-containing particles (b), and a gas barrier laminate having excellent gas barrier properties are likely to be obtained.

Examples of the dispersion treatment include methods using a high-speed agitator, a homogenizer, a ball mill, and a bead mill. In particular, when a ball mill or bead mill is used, dispersion can be efficiently performed, and therefore a coating solution with a stable dispersion state can be obtained in a relatively short time. In this case, the balls or beads preferably have a small diameter, preferably 0.1 to 1 mm.

A coating solution can be prepared by mixing the carboxy group-containing polymer solution with the dispersion liquid of the polyvalent metal-containing particles (b) thus prepared. Although the silicon-containing compound (d) was added to the carboxyl group-containing polymer solution in advance in the above preparation method, instead of adding the silicon-containing compound (d) to the carboxyl group-containing polymer solution, it may be mixed in when mixing the carboxy group-containing polymer solution with the dispersion liquid of the polyvalent metal-containing particles (b).

In the above-described coating solution, the total concentration of components other than the organic solvent (e) is preferably in the range of 0.1 to 60% by mass, more preferably 0.5 to 25% by mass, and particularly preferably 1 to 20% by mass in order to obtain a coating film and a coating layer having desired film thicknesses with a high workability.

The above coating solution may contain various additives such as other polymers, a thickener, stabilizer, ultraviolet absorber, anti-blocking agent, softener, inorganic layered compound (for example, montmorillonite), and colorant (dye, pigment), as needed.

The coating method of the coating solution is not particularly limited, and, for example, may be a method for coating using an air-knife coater, a direct gravure coater, gravure offset, an arc gravure coater, a reverse roll coater such as a top-feed reverse roll coater, a bottom-feed reverse coater, or a nozzle-feed reverse coater, a roll coater of five rolls, a lip coater, a bar coater, a bar reverse coater, or a die coater.

The drying method of the coating solution is not particularly limited, and, for example, it may be a method of drying naturally, a method of drying in an oven set at a predetermined temperature, or a method of using a drying machine attached to a coater such as an arch dryer, a floating dryer, a drum dryer, or an infrared dryer.

The drying conditions can be determined as appropriate depending on factors such as the drying method. For example, when drying is performed in an oven, the drying temperature is preferably in the range of 40 to 150° C., more preferably in the range of 45 to 150° C., especially preferably in the range of 50 to 140° C. The drying time varies depending on the drying temperature, but is preferably in the range of 0.5 seconds to 10 minutes, more preferably in the range of 1 second to 5 minutes, and particularly preferably in the range of 1 second to 1 minute.

It is presumed that the carboxy group-containing polymer (a) and the polyvalent metal-containing particles (b) contained in the coating film react with each other during or after drying to introduce an ionically-crosslinked structure.

In order to allow the ionic crosslinking reaction to proceed sufficiently, the film after drying is preferably aged for 1 second to 10 days, in an atmosphere with a relative humidity of preferably 20% or more, more preferably in the range of 40 to 100%, and under temperature conditions of preferably in the range of 5 to 200° C., and even more preferably in the range of 20 to 150° C.

The gas barrier laminate thus obtained is ionically crosslinked, and therefore has excellent moisture resistance, water resistance, hot water resistance, and water vapor resistance. This gas barrier laminate also exhibits excellent gas barrier properties not only in low-humidity environments but also in high humidity environments. This gas barrier laminate preferably has an oxygen permeability of 10 $cm^3/(m^2 \cdot day \cdot MPa)$ or less as measured at a temperature of 30° C. and a relative humidity of 70% in accordance with the JIS K-7126 B method (equal-pressure method) and the method described in ASTM D3985.

<Packaging Material, Packaging Body, and Packaged Article>

The packaging material according to the present embodiment includes the gas barrier laminate described above. This packaging material is used, for example, to produce a packaging body for packaging articles.

The packaging body according to the present embodiment includes the packaging material described above.

The packaging body may be made of the packaging material described above, or may include the packaging material described above and other members. In the former case, the packaging body is, for example, obtained by forming the above packaging material into a bag. In the latter case, the packaging body is, for example, a container including the packaging material as a lid and a bottomed cylindrical container body.

The packaging material of the packaging body may be a molded article. The molded article may be a container such as a bag or a part of a container such as a lid as described above. Specific examples of packaging bodies or parts thereof include a bag product, a pouch with a spout, a laminated tube, an infusion bag, a container lid, and a paper container.

The applications of this packaging body are not particularly limited. This packaging body can be used for packaging various articles.

The packaged article according to the present embodiment includes the above-described packaging body and the contents contained therein.

As described above, the above gas barrier laminate exhibits excellent gas barrier properties and transparency. Therefore, packaging materials and packaging bodies including this gas barrier laminate are suitable as packaging materials and packaging bodies for articles that easily deteriorate due to oxygen, water vapor, and the like, and are particularly suitable as food packaging materials and food packaging bodies. These packaging materials and packaging bodies can also be preferably used as packaging materials and packaging bodies for packaging chemicals such as agricultural chemicals and medicines, medical appliances, machine parts, and industrial materials such as precision materials.

When the above-described gas barrier laminate is subjected to heat sterilization treatment such as boiling treatment and retort treatment, gas barrier properties and interlayer adhesion do not deteriorate, but rather tend to improve. Therefore, the packaging material and packaging body may be a packaging material for heat sterilization and a packaging body for heat sterilization, respectively.

The packaging material for heat sterilization and the packaging body for heat sterilization are used for packaging articles that are subjected to heat sterilization after packaging.

Examples of the article subjected to heat sterilization treatment after packaging include foods such as curry, stew, soup, sauce, and processed meat products.

Examples of the heat sterilization treatments include boiling treatment and retort treatment.

Boiling treatment is treatment in which wet heat sterilization is performed for storing food products or the like. Although it depends on the contents, in boiling treatment, usually, wet heat sterilization is performed on a packaged article obtained by packaging the contents such as food in the above packaging body at a temperature of 60 to 100° C. and atmospheric pressure for 10 to 120 minutes. Boiling treatment is usually performed using a hot-water tank. Boiling treatments include batch processing in which a packaged article is immersed in a hot-water tank at a constant temperature and taken out after a given time period, and a continuous method in which the packaged article is passed through a hot-water tank tunnel for sterilization.

Retort treatment is typically treatment in which pressure-heat sterilization is performed to kill microorganisms such as mold, yeast, and bacteria for storing food products or the like. In retort treatment, typically, pressure-heat sterilization is performed on a packaged article obtained by packaging food in the above packaging body at a pressure of 0.15 to 0.3 MPa and a temperature of 105 to 140° C. for 10 to 120 minutes. Retort devices include steam type devices using heated steam and hot water type devices using pressurized superheated water. These types of devices are used as appropriate according to sterilization conditions of the food products or the like contained.

EXAMPLES

Specific examples of the present invention will be described below.

<Preparation of Anchor Coat Solution>

In a dilution solvent (ethyl acetate), 1 part by mass of γ-isocyanatopropyltrimethoxysilane and 5 parts by mass of acrylic polyol were mixed and stirred. Subsequently, tolylene diisocyanate (TDI) as an isocyanate compound was added to the solution so that the amount of NCO groups became equal to the amount of OH groups of the acrylic polyol. An anchor coat solution was obtained by diluting the obtained mixture solution with the above-described dilution solvent so that it has a concentration of 2% by mass.

As the acrylic polyol, GS-5756 manufactured by Mitsubishi Rayon Co., Ltd. was used.

<Preparation of Coating Solution for Coating Layer Formation>

(Coating Solution 1)

A carboxy group-containing polymer was dissolved while heating in 2-propanol. As the carboxy group-containing polymer, polyacrylic acid (PAA) (JURYMER (registered trademark) AC-10LP manufactured by Toagosei Co., Ltd. with a number average molecular weight of 50,000) was used. A polyacrylic acid solution containing polyacrylic acid at a concentration of 10% by mass was thus prepared.

1.8 g of polyether phosphate (DISPARLON (registered trademark) DA-375 manufactured by Kusumoto Chemicals, Ltd. having a solid content of 100% by mass) was dissolved in 26.2 g of 2-propanol. Then, 12 g of zinc oxide (FINEX (registered trademark) −30 manufactured by Sakai Chemical Industry Co., Ltd.) having an average primary particle diameter of 35 nm was added to the mixture and stirred. The obtained solution was subjected to dispersion treatment for an hour using a planetary ball mill (P-7 manufactured by Fritsch). Zirconia beads with a diameter of 0.2 mm were used for this dispersion treatment. After that, the beads were filtered out from the solution to obtain a dispersion liquid containing zinc oxide at a concentration of 30% by mass.

Next, 31.20 g of polyacrylic acid (PAA) solution, 5.79 g of zinc oxide dispersion liquid, 0.08 g of silane coupling agent (SC agent) as the silicon-containing compound (KBM-403, 3-glycidoxypropyltrimethoxysilane, manufactured by Shin-Etsu Chemical Co., Ltd.), and 23.57 g of 2-propanol were mixed to prepare the coating solution 1. In this coating solution 1, the molar ratio $((d_t)/(a_t))$ of the number of moles $(d_t)$ of the silicon-containing compound (d) to the number of moles $(a_t)$ of the carboxy groups of the carboxy group-containing polymer (a) was 0.78%.

(Coating Solution 2)

A coating solution 2 was prepared in the same manner as described above for the coating solution 1, except that the amount of the silicon-containing compound added was changed to 0.164 g. In this coating solution 2, the molar ratio $((d_t)/(a_t))$ of the number of moles $(d_t)$ of the silicon-containing compound (d) to the number of moles $(a_t)$ of the carboxy groups of the carboxy group-containing polymer (a) was 1.60%.

(Coating Solution 3)

A coating solution 3 was prepared in the same manner as described above for the coating solution 1, except that the amount of the silicon-containing compound added was changed to 0.499 g. In this coating solution 3, the molar ratio $((d_t)/(a_t))$ of the number of moles $(d_t)$ of the silicon-containing compound (d) to the number of moles $(a_t)$ of the carboxy groups of the carboxy group-containing polymer (a) was 4.87%.

(Coating Solution 4)

A coating solution 4 was prepared in the same manner as described above for the coating solution 1, except that the amount of the silicon-containing compound added was changed to 0.655 g. In this coating solution 4, the molar ratio $((d_t)/(a_t))$ of the number of moles $(d_t)$ of the silicon-containing compound (d) to the number of moles $(a_t)$ of the carboxy groups of the carboxy group-containing polymer (a) was 6.40%.

(Coating Solution 5)

A coating solution 5 was prepared in the same manner as described above for the coating solution 1, except that no silicon-containing compound was added. In this coating solution 5, the molar ratio $((d_t)/(a_t))$ of the number of moles $(d_t)$ of the silicon-containing compound (d) to the number of moles $(a_t)$ of the carboxy groups of the carboxy group-containing polymer (a) was 0%.

<Production of Gas Barrier Laminate>

Example 1

The anchor coat solution 1 was applied onto one side of a biaxially-stretched polypropylene film (manufactured by Mitsui Chemicals Tohcello, Inc., trade name: ME-1, thickness 20 μm), using a bar coater so that it had a thickness of 0.2 μm after drying at 150° C. for 1 minute. The anchor coat layer was thus formed.

Then, using a vacuum deposition device based on an electron beam heating method, silicon was evaporated, while introducing oxygen gas thereto, to deposit silicon oxide on this anchor coat layer, thereby forming an inorganic deposition layer with a thickness of 20 nm.

The coating solution 1 was applied onto this inorganic deposition layer using a bar coater (wire bar). This coating film was dried in an oven at 50° C. for 1 minute to form a coating layer having a thickness of 500 nm. A laminate 1 was thus obtained. The method used to measure the film thickness of the coating layer will be described later.

Example 2

A laminate 2 was obtained in the same manner as described above for the laminate 1 of Example 1, except that the film thickness of the coating layer was changed by changing the amount of the coating solution 1 applied.

Example 3

A laminate 3 was obtained in the same manner as described above for the laminate 1 of Example 1, except that the inorganic deposition layer of silicon oxide was changed to an inorganic deposition layer of aluminum oxide, and that the film thickness of the coating layer was changed by changing the amount of the coating solution 1 applied.

Example 4

A laminate 4 was obtained in the same manner as described above for the laminate 1 of Example 1, except that coating solution 1 was changed to the coating solution 2, and that the film thickness of the coating layer was changed by changing the amount of the coating solution applied.

Example 5

A laminate 5 was obtained in the same manner as described above for the laminate 1 of Example 1, except that coating solution 1 was changed to the coating solution 3, and that the film thickness of the coating layer was changed by changing the amount of the coating solution applied.

Comparative Example 1

A laminate 1C was obtained in the same manner as described above for the laminate 1 of Example 1, except that no inorganic deposition layer was formed, and that the film thickness of the coating layer was changed by changing the amount of the coating solution 1 applied.

Comparative Example 2

A laminate 2C was obtained in the same manner as described above for the laminate 1 of Example 1, except that the film thickness of the coating layer was changed by changing the amount of the coating solution 1 applied.

Comparative Example 3

A laminate 3C was obtained in the same manner as described above for the laminate 4 of Example 4, except that no inorganic deposition layer was formed, and that the film thickness of the coating layer was changed by changing the amount of the coating solution 2 applied.

Comparative Example 4

A laminate 4C was obtained in the same manner as described above for the laminate 5 of Example 5, except that no inorganic deposition layer was formed.

Comparative Example 5

A laminate 5C was obtained in the same manner as described above for the laminate 1 of Example 1, except that no inorganic deposition layer was formed, and that the coating solution 1 was changed to the coating solution 4.

Comparative Example 6

A laminate 6C was obtained in the same manner as described above for the laminate 1 of Example 1, except that the coating solution 1 was changed to the coating solution 4.

Comparative Example 7

A laminate 7C was obtained in the same manner as described above for the laminate 1 of Example 1, except that no inorganic deposition layer was formed, and that the coating liquid 1 was changed to the coating solution 5.

<Measurement of Film Thickness of Coating Layer>

After embedding the obtained laminate in an embedding resin and exposing its cross section with a microtome, the cross section of the laminate was observed using a scanning electron microscope (SEM). Using the obtained SEM image, the thickness of the coating layer was measured at 10 points in flat parts thereof, and the average value was taken as the thickness of the coating layer.

<Evaluation>

[Transparency]

For each of the obtained laminates, the haze of the coating layer was measured according to JIS-K7105-1981 by using a haze meter (NDH2000, manufactured by Nippon Denshoku Industries, Co., Ltd.). Samples with a haze value of 10% or less were rated A, and samples with a haze value higher than 10% were rated B. When a laminate has a haze value equal to lower than 10%, the laminate has the desired transparency. The results are shown in Table 1.

[Oxygen Permeability]

Each of the obtained laminates was cut into a 20 cm×20 cm piece, and was subjected to retort treatment at 0.2 MPa and 120° C. for 30 minutes using a hot water immersion retort. The oxygen permeability of each sample after retort treatment was measured by using an oxygen transmission rate tester, OXTRAN (registered trademark) 2/20, manufactured by Modern Control Inc, under temperature conditions of 30° C. and a relative humidity of 70%. The measuring method was in accordance with the JIS K-7126 B method (equal-pressure method) and ASTM D3985, and the measurement values were expressed in units of $cm^3/(m^2 \cdot day \cdot MPa)$. Samples with an oxygen permeability of 10 $cm^3/(m^2 \cdot day \cdot MPa)$ or less were rated A, and samples with an oxygen permeability higher than 10 $cm^3/(m^2 \cdot day \cdot MPa)$ were rated B. When a sample has an oxygen permeability equal to or lower than 10 $cm^3/(m^2 \cdot day \cdot MPa)$, the laminate exhibits the desired gas barrier properties in a high temperature and high humidity environments. The results are shown in Table 1.

TABLE 1

| | | Inorganic deposition layer | | Coating layer | | | | | Gas barrier performance | |
|---|---|---|---|---|---|---|---|---|---|---|
| | | | | | | SC agent/PAA | Transparency | | Oxygen permeability | |
| | Laminate | Inorganic oxide | Film thickness (nm) | Coating solution | Film thickness (nm) | (molar ratio) [%] | Haze (%) | Rating | $(cm_3/(m_2 \cdot day \cdot Mpa)$ | Rating |
| Ex. 1 | 1 | SiO | 20 | 1 | 500 | 0.78 | 7.2 | A | <10 | A |
| Ex. 2 | 2 | SiO | 20 | 1 | 250 | 0.78 | 2.0 | A | <10 | A |
| Ex. 3 | 3 | AlO | 15 | 1 | 300 | 0.78 | 4.5 | A | <10 | A |
| Ex. 4 | 4 | SiO | 20 | 2 | 250 | 1.60 | 2.6 | A | <10 | A |
| Ex. 5 | 5 | SiO | 20 | 3 | 300 | 4.87 | 4.4 | A | <10 | A |
| Comp. Ex. 1 | 1C | Absent | | 1 | 250 | 0.78 | 2.0 | A | 25.0 | B |
| Comp. Ex. 2 | 2C | SiO | 20 | 1 | 220 | 0.78 | 2.1 | A | 30.0 | B |
| Comp. Ex. 3 | 3C | Absent | | 2 | 450 | 1.60 | 19.2 | B | 12.0 | B |
| Comp. Ex. 4 | 4C | Absent | | 3 | 300 | 4.87 | 4.7 | A | 35.0 | B |
| Comp. Ex. 5 | 5C | Absent | | 4 | 500 | 6.40 | 20.3 | B | 50.0 | B |
| Comp. Ex. 6 | 6C | SiO | 20 | 4 | 500 | 6.40 | 23.6 | B | 20.0 | B |
| Comp. Ex. 7 | 7C | Absent | | 5 | 160 | 0 | 2.4 | A | 30.0 | B |

As shown in Table 1, the laminates 1 to 5 (Examples 1 to 5) according to the present embodiment was excellent in both transparency and gas barrier properties in a high temperature and high humidity environments.

The present invention should not be limited to the embodiments described above, but various modifications can be made thereto when implemented, without departing from the spirit of the present invention. The embodiments may be appropriately combined in implementation. In this case, the combinations each exert the advantageous effects accordingly. The embodiments described above include various inventions. Therefore, various inventions can be extracted from combinations selected from a plurality of constituent elements disclosed herein. For example, even if some constituent elements are eliminated from all the constituent elements disclosed in the embodiments, the configuration with these constituent elements eliminated can be understood to be within the scope of the invention as long as the issues can be solved and the advantageous effects can be achieved.

REFERENCE SIGNS LIST

1 Substrate; 2 Inorganic deposition layer; 3 Coating layer; 4 Anchor coat layer; 10, 20 Gas barrier laminate.

What is claimed is:

1. A gas barrier laminate, comprising:

a substrate; an inorganic deposition layer containing an inorganic oxide; and a coating layer, which are arranged in this order, the coating layer containing a carboxy group-containing polymer (a), polyvalent metal-containing particles (b), a surfactant (c), and a silicon-containing compound (d), the silicon-containing compound (d) being at least one selected from a group consisting of a silane coupling agent represented by a general formula (1), a silane coupling agent represented by a general formula (2), hydrolysates thereof, and condensates thereof, a molar ratio $(d_t)/(a_t)$ of a number of moles $(d_t)$ of the silicon-containing compound (d) to a number of moles $(a_t)$ of a carboxy group of the carboxy group-containing polymer (a) being 0.15% or more and 6.10% or less, the coating layer having a film thickness of 230 nm or more and 600 nm or less, where $(d_t)$ in the molar ratio $(d_t)/(a_t)$ is the number of moles of the silicon-containing compound (d) converted into an equivalent number of moles of the silane coupling agent, and where $$Si(OR_1)_3Z_1 \quad \text{the general formula (1)}$$

$$Si(R_2)(OR_3)_2Z_2, \quad \text{the general formula (2)}$$

in the general formula (1), $R_1$ is an alkyl group having 1 to 6 carbon atoms, which may be the same or different from each other, $Z_1$ is a group having an epoxy group, and in the general formula (2), $R_2$ is a methyl group, $R_3$ is an alkyl group having 1 to 6 carbon atoms, which may be the same or different from each other, and $Z_2$ is a group having an epoxy group, wherein the polyvalent metal-containing particles (b) are dispersed as particles in the coating layer.

2. The gas barrier laminate of claim 1, wherein the carboxy group-containing polymer (a) contains at least a constituent unit originating from at least one α,β-mono ethylenically unsaturated carboxylic acid selected from a group consisting of acrylic acid, methacrylic acid, crotonic acid, itaconic acid, maleic acid, and fumaric acid.

3. The gas barrier laminate of claim 1, wherein a polyvalent metal forming the polyvalent metal-containing particles (b) is a divalent metal.

4. The gas barrier laminate of claim 1, further comprising an anchor coat layer between the substrate and the inorganic deposition layer.

5. A packaging material including the gas barrier laminate of claim 1.

6. A packaging body including the packaging material of claim 5.

7. A packaged article including the packaging body of claim 6 and contents contained in the packaging body.

8. The gas laminate of claim 1 having an oxygen permeability of less than 10 ($cm^3/(m^2 \cdot day \cdot Mpa)$) after heat retortion at a pressure of 0.15 to 0.3 MPa and a temperature of 105 to 140° C. for 10 to 120 minutes.

9. The gas laminate of claim 8 having a haze value of 10% or less after the heat retortion.

10. The gas laminate of claim 1, wherein the surfactant (c) is an anionic surfactant selected from the group comprising carboxylic acid, sulfonic acid, sulfate, and phosphate ester surfactant.

11. The gas laminate of claim 1, wherein the surfactant (c) is polyester phosphate.

12. The gas laminate of claim 11, wherein the polyvalent metal-containing particles (b) are zinc oxide particles.

* * * * *